United States Patent
Kuroiwa et al.

(10) Patent No.: US 6,934,553 B2
(45) Date of Patent: Aug. 23, 2005

(54) RECEIVING UNIT, RECEIVING METHOD AND SEMICONDUCTOR DEVICE

(75) Inventors: Koichi Kuroiwa, Kawasaki (JP); Shoji Taniguchi, Kawasaki (JP); Masami Kanasugi, Kawasaki (JP); Junichi Sugimoto, Aichi (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 10/102,738

(22) Filed: Mar. 22, 2002

(65) Prior Publication Data

US 2003/0050022 A1 Mar. 13, 2003

(30) Foreign Application Priority Data

Sep. 12, 2001 (JP) ........................................ 2001-276343

(51) Int. Cl.$^7$ ............................. H04B 15/00; H04B 7/01
(52) U.S. Cl. ...................... 455/500; 455/504; 455/133; 375/349
(58) Field of Search ........................... 455/65, 132–135, 455/303, 500, 504, 506, 101, 304, 562.1, 575.7; 375/147, 349, 148, 150; 370/335, 342

(56) References Cited

U.S. PATENT DOCUMENTS

| | | | |
|---|---|---|---|
| 6,178,193 B1 | * | 1/2001 | Kondo ........................ 375/130 |
| 6,229,842 B1 | * | 5/2001 | Schulist et al. ............. 375/148 |
| 6,275,483 B1 | * | 8/2001 | Papasakellariou et al. .. 370/335 |
| 6,553,059 B1 | * | 4/2003 | Ito .............................. 375/150 |
| 6,650,692 B2 | * | 11/2003 | Inoue et al. ................ 375/147 |
| 6,768,729 B1 | * | 7/2004 | Ohsuge ...................... 370/342 |

FOREIGN PATENT DOCUMENTS

| | | | |
|---|---|---|---|
| EP | 0942539 A2 | 9/1999 | |
| EP | 0951148 | 10/1999 | |
| EP | 0 951 148 | * 10/1999 | ............ H04B/7/02 |
| EP | 1091501 A1 | 4/2001 | |
| EP | 1096711 | 5/2001 | |
| EP | 1096711 A1 | 5/2001 | |
| WO | WO01/26244 A1 | 4/2001 | |

OTHER PUBLICATIONS

European Search Report dated Nov. 18, 2002 for European Application No. Feb. 25, 1944.

* cited by examiner

*Primary Examiner*—Simon Nguyen
(74) *Attorney, Agent, or Firm*—Staas & Halsey LLP

(57) ABSTRACT

A receiving unit that reduces the amount of power consumed for detecting the timing of each of a plurality of paths via which received signals were received. A receiving section receives signals sent from a base station and transmitted via a plurality of paths. A path detecting section detects the timing of each of the plurality of paths via which the received signals received by the receiving section were transmitted. A path detection range setting section sets a range where a path is detected by the path detecting section on the basis of information indicative of path timing detected by the path detecting section.

16 Claims, 14 Drawing Sheets

RECEIVING UNIT, RECEIVING METHOD AND SEMICONDUCTOR DEVICE

BACKGROUND OF THE INVENTION (1) Field of the Invention

This invention relates to a receiving unit, receiving method, and semiconductor device and, more particularly, to a receiving unit and receiving method for receiving and demodulating signals sent from a base station and a semiconductor device for processing signals sent from a base station.

(2) Description of the Related Art

With code division multiple access (CDMA) communication, information sent via a plurality of channels or information sent from users is multiplexed with a spreading code and is transmitted via a radio line.

Random changes in amplitude and phase and fading with a maximum frequency which depends on the speed of a mobile station and the frequency of a carrier will occur in mobile communication. As a result, compared with radio communication between fixed stations, it is difficult to perform stable receiving.

Spread spectrum communication will reduce degradation in communication quality caused by such frequency selective fading. With this spread spectrum communication, signals in a narrow band are spread in a wide band and are sent. Therefore, even if receiving field strength weakens at a specific frequency, information can be restored from other bands.

Moreover, it has been shown that if fading occurs in mobile communication, delayed waves caused by buildings and terrain will create a multipath fading environment.

With direct-sequence spread spectrum communication, delayed waves will be interference waves for a spreading code, so receiving characteristics will be degraded. RAKE receiving is known as a method for improving characteristics by making use of delayed waves.

With the RAKE receiving, despreading is performed on each delayed wave which arrives via each of multipaths, the delay time of delayed waves is matched, weighting is performed on the delayed waves according to their received levels, and the delayed waves are added together. This can minimize the influence of multipaths.

Multipaths are searched for by a path search block which includes a matched filter section, delay profile integration section, and path selection section. FIG. 11 is a block diagram of a conventional receiving unit based on RAKE receiving.

As shown in FIG. 11, a conventional receiving unit comprises an antenna 10, a receiving section 11, a quadrature detection section 12, analog-to-digital (A/D) conversion sections 13 and 14, a path search section 15, and a RAKE combining/demodulation section 16.

The antenna 10 acquires electronic waves sent from a base station.

The receiving section 11 converts electronic waves acquired by the antenna 10 into radio frequency (RF) signals, converts the RF signals into intermediate frequency (IF) signals, and outputs the IF signals.

The quadrature detection section 12 performs quadrature detection on IF signals output from the receiving section 11 to separate and demodulate I channel (Ich) signals and Qch signals.

The A/D conversion sections 13 and 14 convert Ich signals and Qch signals, respectively, output from the quadrature detection section 12 into digital signals and output them.

The path search section 15 receives digital signals output from the A/D conversion sections 13 and 14, searches them for multipaths, and outputs the timing of each path.

The RAKE combining/demodulation section 16 refers to timing signals supplied from the path search section 15, performs a despreading process on Ich signals and Qch signals, which are output from the A/D conversion sections 13 and 14 respectively, according to paths, recovers the original data from I symbol data and Q symbol data obtained by the despreading, and combines and outputs recovered results.

FIG. 12 is a view showing the detailed structure of the path search section 15. As shown in FIG. 12, the path search section 15 includes a matched filter 30, delay profile integration section 31, and path selection section 32.

The matched filter 30 consists of a 256-tap matched filter and calculates and outputs the auto-correlation values of desired signals included in Ich signals and Qch signals.

The delay profile integration section 31 includes a power value calculation section 31a and memory 31b and calculates and outputs power values by integrating output from the matched filter 30 and calculating geometric means.

The power value calculation section 31a calculates power values by integrating input Ich signals and Qch signals by the slot and calculating geometric means, integrates the power values by the frame ("frame" is greater than a "slot"), and outputs the results.

The memory 31b temporarily stores data to be used by the power value calculation section 31a for performing an operation.

The path selection section 32 refers to data output from the delay profile integration section 31, selects n paths in descending order of power of received signal, and outputs information indicative of their timing as effective multipath information.

Now, operation in the above conventional receiving unit will be described.

The antenna 10 acquires electronic waves sent from a base station and supplies them to the receiving section 11.

The receiving section 11 converts the electronic waves acquired by the antenna 10 into RF signals, converts the RF signals into IF signals, and outputs the IF signals.

The quadrature detection section 12 multiplies the signals output from the receiving section 11 and a sine wave together to generate Ich signals, multiplies the signals output from the receiving section 11 and a cosine wave together to generate Qch signals, and outputs the Ich and Qch signals.

The A/D conversion section 13 converts the Ich signals (analog signals) output from the quadrature detection section 12 into digital signals and output them.

The A/D conversion section 14 converts the Qch signals (analog signals) output from the quadrature detection section 12 into digital signals and output them.

By performing a predetermined process on the Ich and Qch signals, the path search section 15 selects n paths in descending order of power and outputs the timing of each path. That is to say, as shown in FIG. 13, the received levels of signals sent from a sending unit differ among different multipaths. Moreover, the time when these signals arrive at the receiving unit also differs among the different paths. The matched filter 30 in the path search section 15 receives the Ich and Qch signals, multiplies the Ich signals and a predetermined despreading code together, and multiplies the Qch signals and a predetermined despreading code together. By doing so, the matched filter 30 extracts and outputs signals for a user's channel included in the Ich and Qch signals.

The power value calculation section 31a in the delay profile integration section 31 first integrates data output from the matched filter 30 by the slot. Then the power value calculation section 31a calculates the geometric means of data obtained by the integration by the slot to obtain power values. In this case, there are two kinds of signals: the Ich signals and Qch signals. Therefore, the power value calculation section 31a obtains power values by calculating, for example, $(I+jQ)\times(I-jQ)=I\times I+Q\times Q$. Then the power value calculation section 31a integrates the power values by the frame and outputs the results.

The path selection section 32 refers to the data output from the delay profile integration section 31, selects n paths from among a plurality of paths in descending order of power, and outputs information indicative of their timing as effective multipath information.

As shown in FIG. 14, a fixed range with the maximum multipath detected the last time as a center which has a width of a total of 256 chips is set and multipaths are detected in this range. This setting is based on data regarding terrain which will generate the strongest multipaths.

By the way, the precision of detection is improved by oversampling received signals by the chip. For example, if an oversampling rate and the number of received bits for the I channel and Q channel are 4, 6, and 6 respectively, then 256×4×6=1024×6 bits for both the I and Q channels.

The matched filter 30 usually includes shift registers and addition trees. Therefore, if such oversampling is performed, a vast number of shift registers and addition trees corresponding to the above number will operate in synchronization with a basic clock. As a result, a large amount of power will be consumed.

In addition, the delay profile integration section 31 will generate data corresponding to 1024 samples for one slot. To store all these pieces of data, memory areas corresponding to 1024 words are needed in the memory 31b.

Furthermore, the path selection section 32 needs to select, for example, three multipaths in descending order of power from data corresponding to 1024 samples, which are output from the delay profile integration section 31, and to output them.

As stated above, conventional receiving units have detected multipaths on the basis of data regarding terrain which will generate the strongest multipaths. Therefore, when these receiving units are used in an ordinary environment, paths will be detected in an unnecessarily wide range.

As a result, a vast amount of power will be consumed. Sufficient communication time therefore cannot be secured especially in the case of battery capacity being limited (in mobile communication, for example).

SUMMARY OF THE INVENTION

The present invention was made under the background circumstances as described above. An object of the present invention is to provide a receiving unit and receiving method which make the path tracking operation of a receiving unit, which adopts a multipath tracking system, efficient and which can reduce power consumption and a semiconductor device which enables such a process.

In order to achieve the above object, a receiving unit for receiving and demodulating signals sent from a base station is provided. This receiving unit comprises receiving means for receiving signals sent from the base station and transmitted via a plurality of paths, path detecting means for detecting the timing of each of the plurality of paths via which the received signals received by the receiving means were transmitted, and path detection range setting means for setting a range where a path is detected by the path detecting means on the basis of information indicative of path timing detected by the path detecting means.

Moreover, in order to achieve the above object, a receiving method for receiving and demodulating signals sent from a base station is provided. This receiving method comprises a receiving step for receiving signals sent from the base station and transmitted via a plurality of paths, path detecting step for detecting the timing of each of the plurality of paths via which the received signals received by the receiving step were transmitted, and path detection range setting step for setting a range where a path is detected by the path detecting step on the basis of information indicative of path timing detected by the path detecting step.

Furthermore, in order to achieve the above object, a semiconductor device for processing signals sent from a base station is provided. This semiconductor device comprises path detecting means for detecting the timing of each of a plurality of paths via which received signals were received and path detection range setting means for setting a range where a path is detected by the path detecting means on the basis of information indicative of path timing detected by the path detecting means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
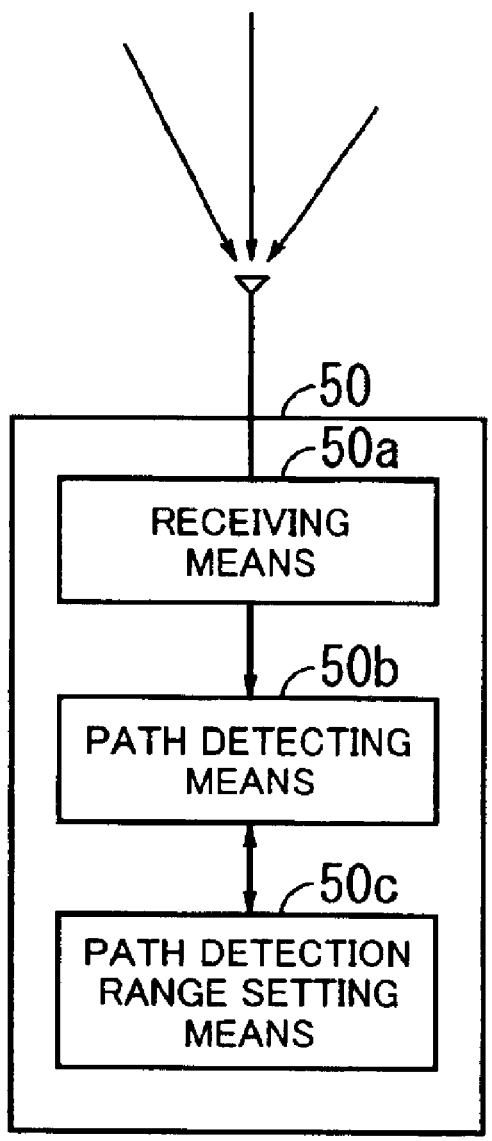
FIG. 1 is a view for describing the operative principles of the present invention.

FIG. 1 is a view for describing the operative principles of the present invention. As shown in FIG. 1, a receiving unit 50 according to the present invention comprises receiving means 50a, path detecting means 50b, and path detection range setting means 50c.

The receiving means 50a receives electronic waves sent from a base station and transmitted via a plurality of paths and converts them into the corresponding electrical signals.

The path detecting means 50b detects the timing of each of a plurality of paths via which signals received by the receiving means 50a were transmitted.

The path detection range setting means 50c sets a range in which the path detecting means 50b detects a path.

Now, operation performed in FIG. 1 will be described. It is assumed that the path detecting means 50b includes a 256-tap matched filter.

When electronic waves sent from a base station arrive at the receiving unit 50 via a plurality of paths, the receiving means 50a receives these electronic waves, converts them into the corresponding electrical signals, and outputs the electrical signals to the path detecting means 50b.

The path detecting means 50b extracts desired signals by multiplying the received signals output from the receiving means 50a and a predetermined despreading code together and detects paths included in the desired signals. To be concrete, the path detecting means 50b including a 256-tap matched filter calculates correlation values by multiplying the received signals input and 256 coefficients included in the despreading code together and converts the obtained correlation values into power values. Then the path detecting means 50b outputs timing information regarding three paths selected in descending order of power from among a plurality of paths included in the signals converted into the power values as effective multipath information.

The path detection range setting means 50c sets a range in which the path detecting means 50b detects a path. That is to say, if the path detecting means 50b searches for three paths in descending order of power, then the path detection range setting means 50c refers to the last search result and sets the narrowest range including the three paths as the next search range.

As a result, the operation of the path detecting means 50b can be stopped outside the range including the three paths. Therefore, the amount of power consumed by the whole unit can be reduced.

Now, an embodiment of the present invention will be described with reference to FIG. 2.

Figure 2:
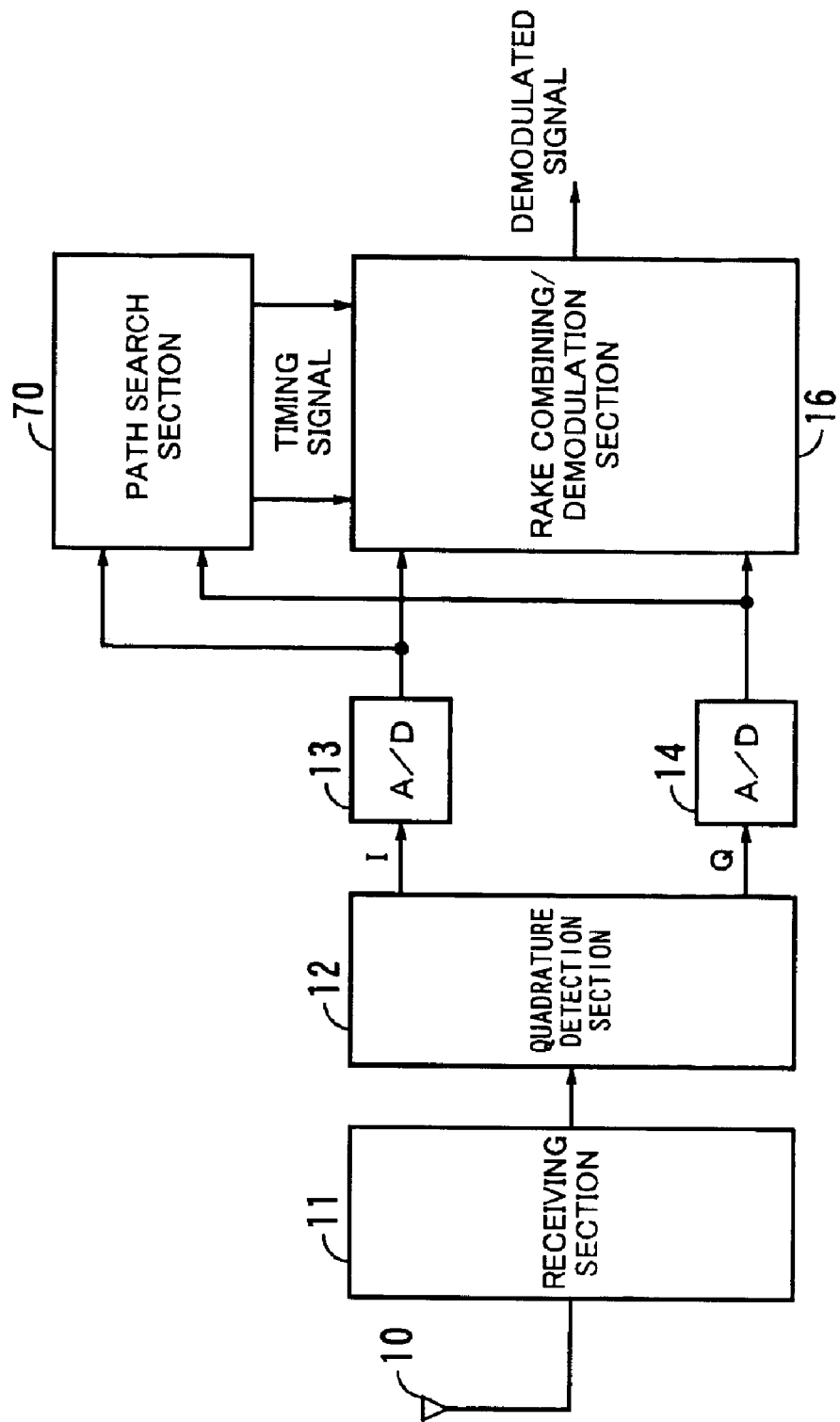
FIG. 2 is a view showing the structure of an embodiment of the present invention.
Figure 11:
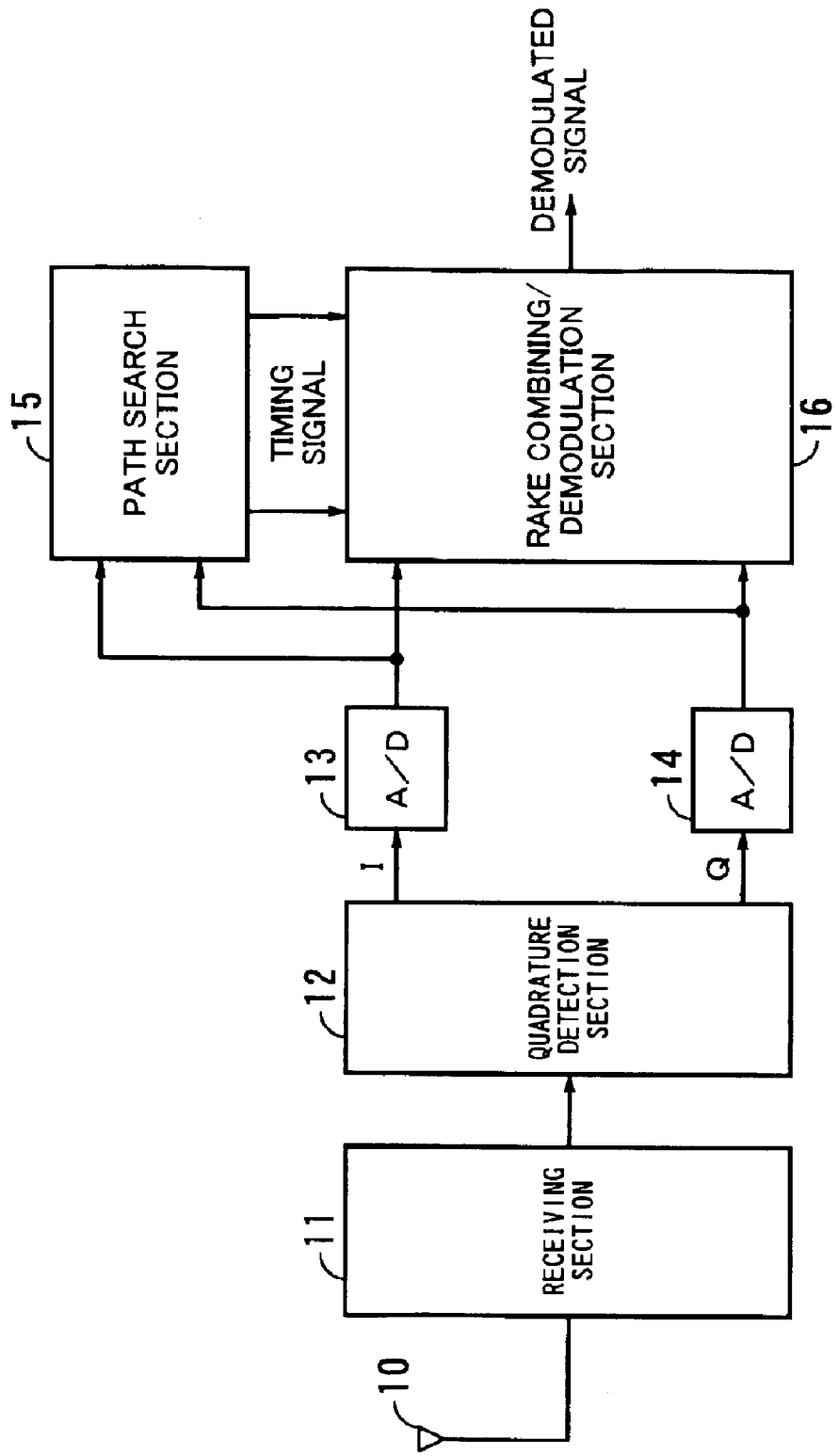
FIG. 11 is a view showing the structure of a conventional receiving unit.

As shown in FIG. 2, a receiving unit according to the present invention comprises an antenna 10, a receiving section 11, a quadrature detection section 12, A/D conversion sections 13 and 14, a path search section 70, and a RAKE combining/demodulation section 16. The receiving unit shown in FIG. 2 differs from the one shown in FIG. 11 in the structure of the path search section 70.

The antenna 10 acquires electronic waves sent from a base station.

The receiving section 11 converts electronic waves acquired by the antenna 10 into RF signals, converts the RF signals into IF signals, and outputs the IF signals.

The quadrature detection section 12 performs quadrature detection on IF signals output from the receiving section 11 to separate and demodulate Ich signals and Qch signals.

The A/D conversion sections 13 and 14 convert Ich signals and Qch signals, respectively, output from the quadrature detection section 12 into digital signals and output them.

The path search section 70 receives digital signals output from the A/D conversion sections 13 and 14, searches them for multipaths, and outputs the timing of each path.

The RAKE combining/demodulation section 16 refers to timing signals supplied from the path search section 70, performs a despreading process on Ich signals and Qch signals, which are output from the A/D conversion sections 13 and 14 respectively, according to paths, recovers the original data from I symbol data and Q symbol data obtained by the despreading, and combines and outputs recovered results.

Figure 3:
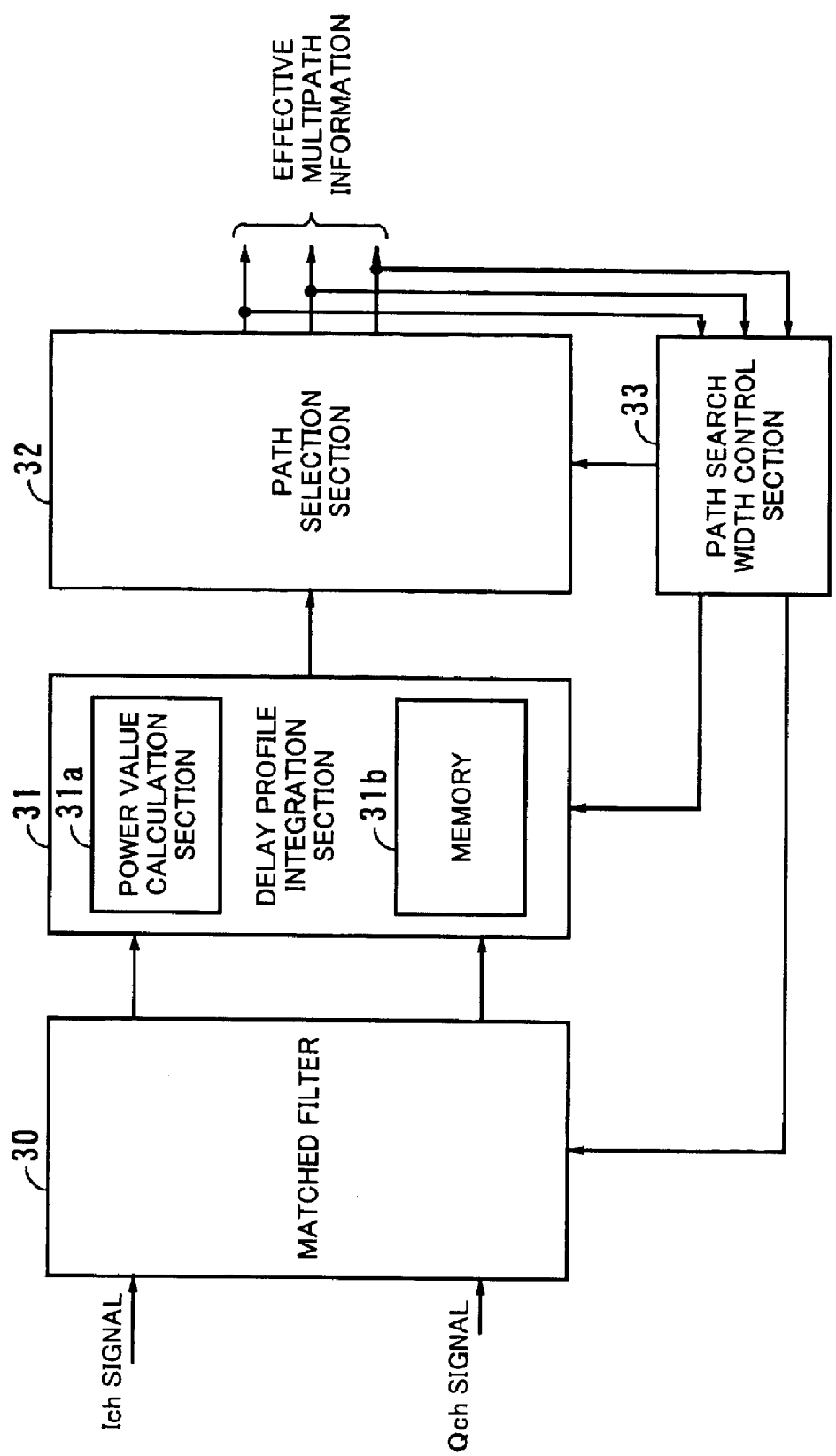
FIG. 3 is a view showing the detailed structure of the path search section shown in FIG. 2.
Figure 12:
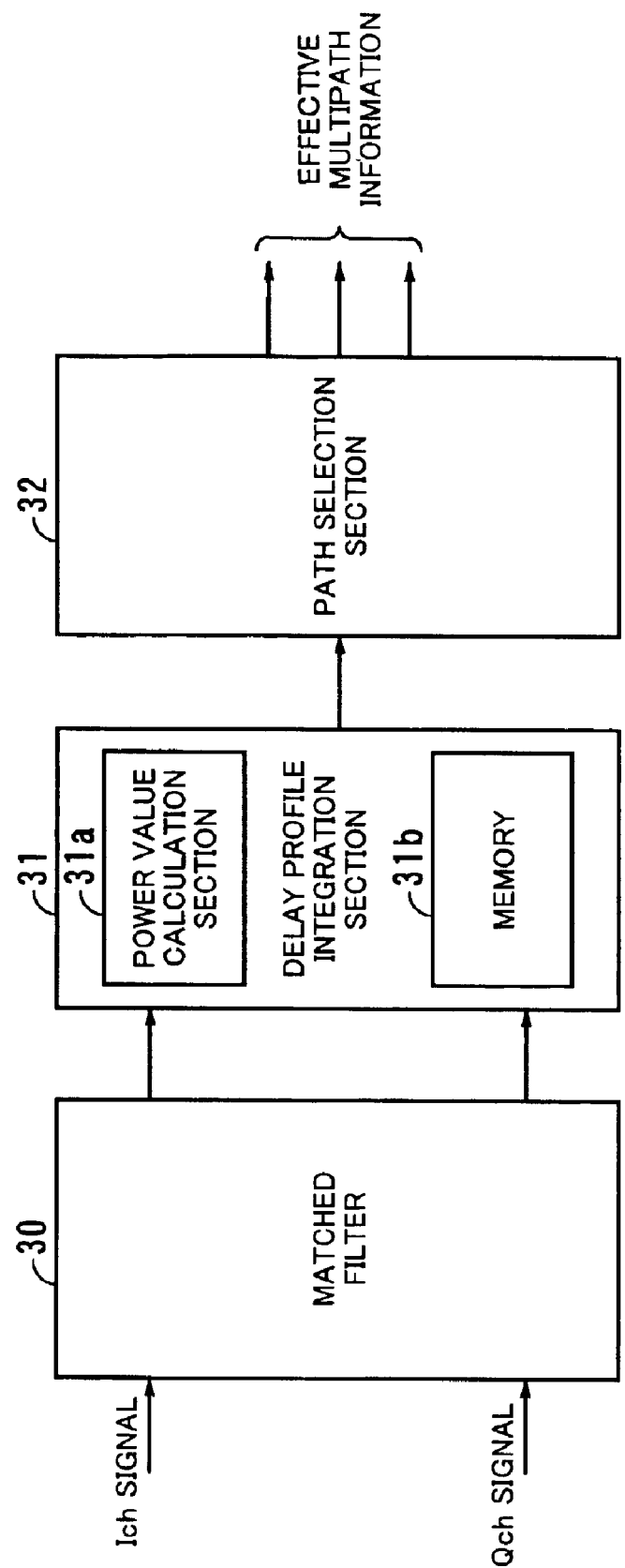
FIG. 12 is a view showing the detailed structure of the path search section shown in FIG. 11.
Figure 13:
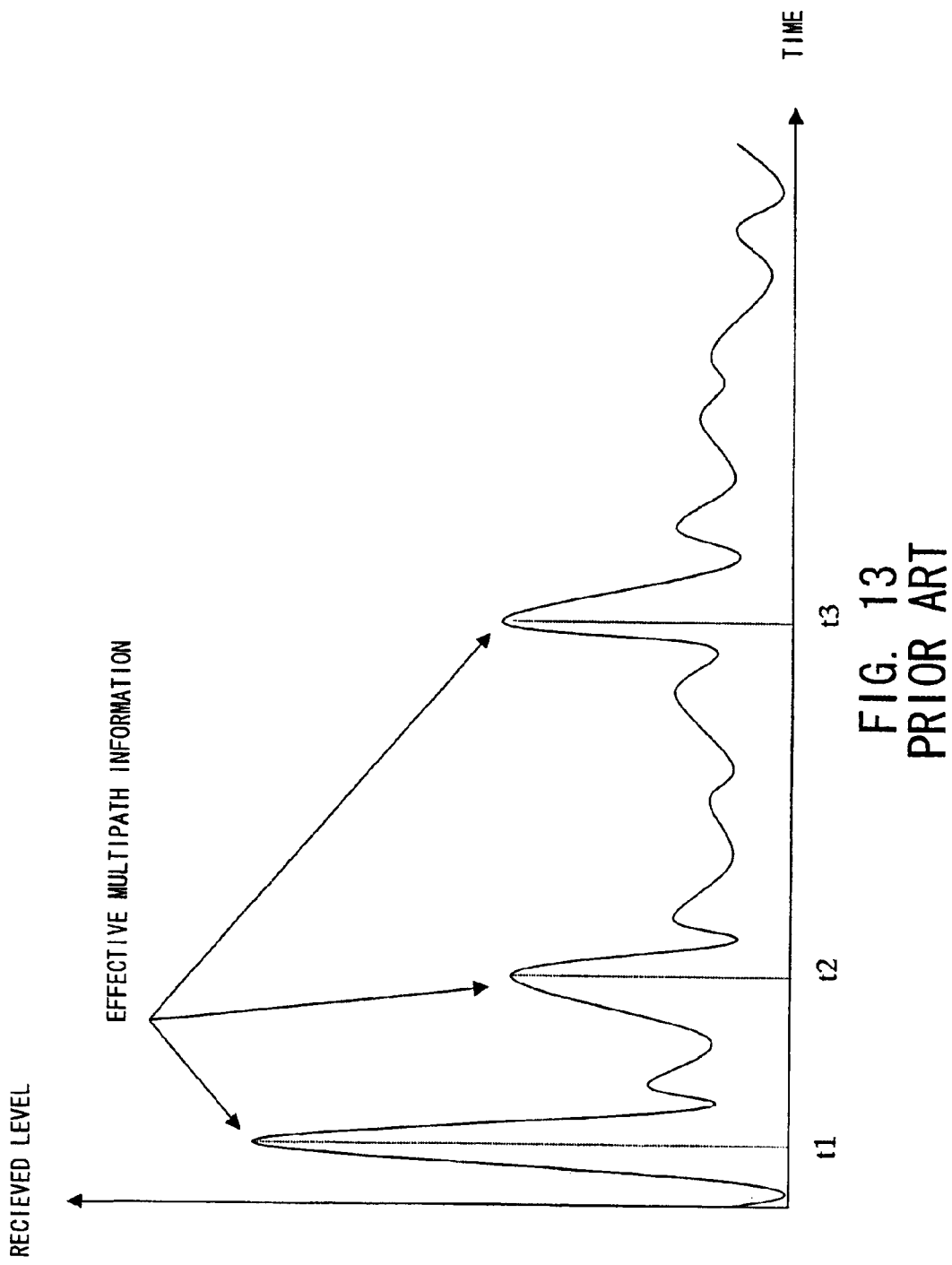
FIG. 13 is a view showing how the received levels of signals sent from a sending unit differ among different paths and how the time when these signals arrive at a receiving unit differs among the different paths.
Figure 14:
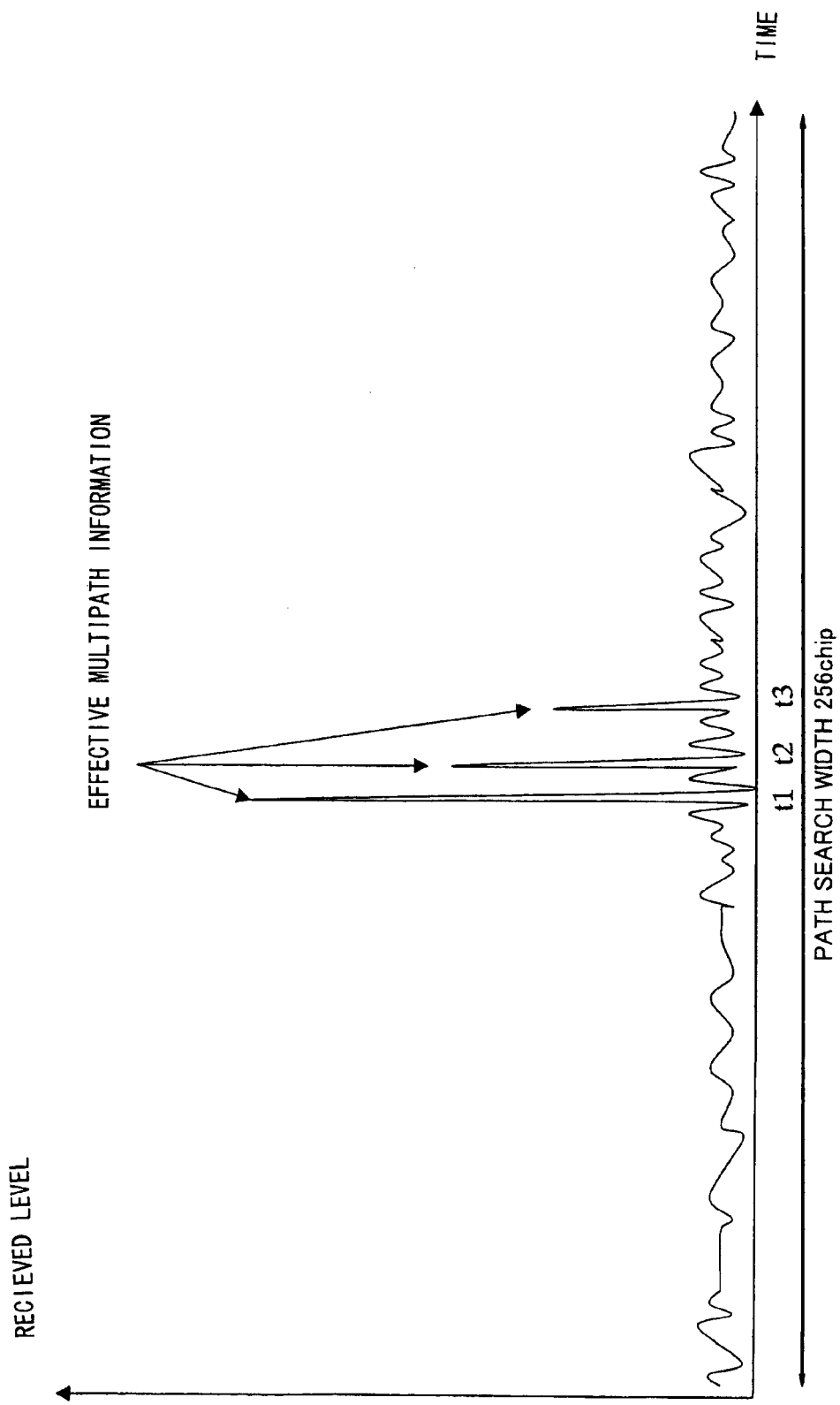
FIG. 14 is a view showing an example of a range where multipaths are detected.

FIG. 3 is a view showing the detailed structure of the path search section 70. As shown in FIG. 3, the path search section 70 includes a matched filter 30, delay profile integration section 31, path selection section 32, and path search width control section 33. Compared with FIG. 12, the path search width control section 33 is newly added. The other components are the same as those in FIG. 12.

The matched filter 30 consists of a 256-tap matched filter and calculates and outputs the auto-correlation values of desired signals included in Ich signals and Qch signals.

Figure 4:
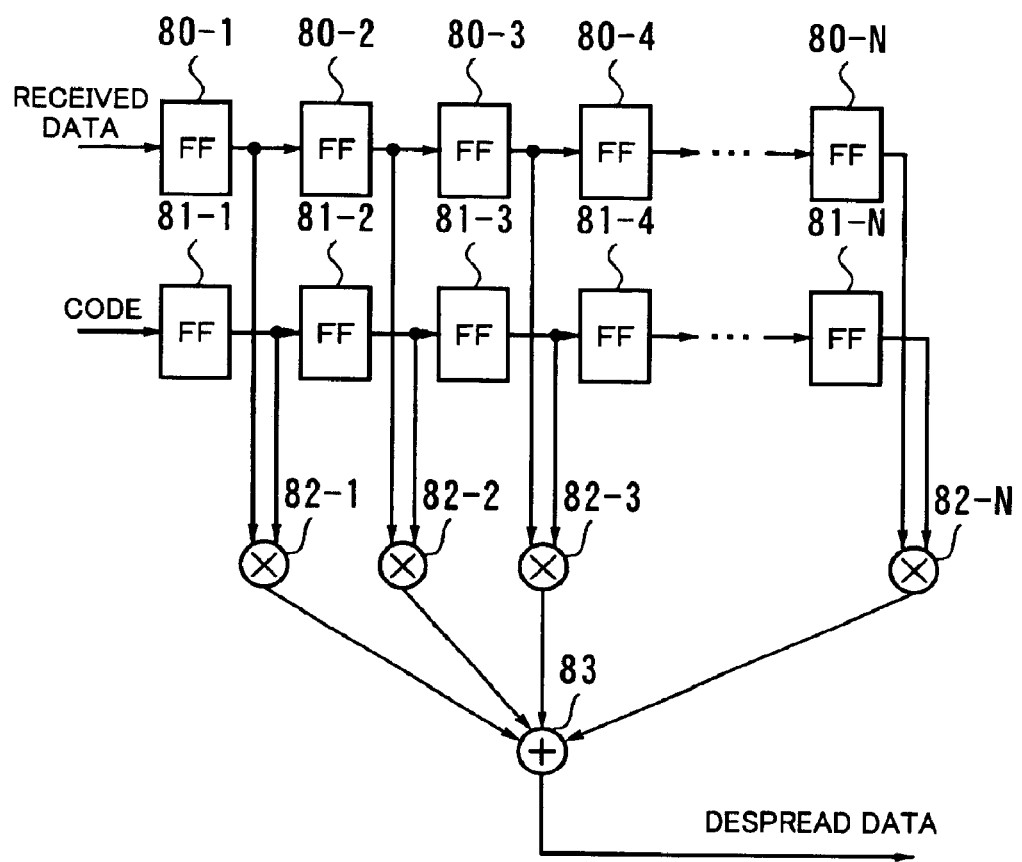
FIG. 4 is a view showing the detailed structure of the matched filter shown in FIG. 3.

FIG. 4 is a view showing the detailed structure of the matched filter 30. The structure shown in FIG. 4 is for either the I channel or the Q channel.

As shown in FIG. 4, the matched filter 30 includes flip-flops (FFs) 80-1 through 80-N, FFs 81-1 through 81-N, multiplying circuits 82-1 through 82-N, and an adding circuit 83.

The FFs 80-1 through 80-N delay in turn received data input from the A/D conversion section 13 or 14 in synchronization with a clock signal (not shown) and transfer it to an FF at the next stage.

A despreading codes is input to the FFs 81-1 through 81-N. The FFs 81-1 through 81-N transfer this despreading code in turn to an FF at the next stage. The FFs 81-1 through 81-N stop this transfer process when the storing of all the despreading codes is completed.

The multiplying circuit 82-1 multiplies data output from the FF 80-1 and data output from the FF 81-1 together and outputs the result obtained. Each of the multiplying circuits 82-2 through 82-N does multiplication in the same way and outputs the result.

The adding circuit 83 calculates the sum total of data output from the multiplying circuits 82-1 through 82-N and outputs it as despread data.

In FIG. 3, the delay profile integration section 31 includes a power value calculation section 31a and memory 31b and calculates and outputs power values by integrating output from the matched filter 30 and calculating geometric means.

The power value calculation section 31a calculates power values by integrating input Ich signals and Qch signals by the slot and calculating geometric means, integrates the power values by the frame ("frame" is greater than a "slot"), and outputs the results.

The memory 31b temporarily stores data to be used by the power value calculation section 31a for performing an operation. The memory 31b consists of, for example, a plurality of memory banks and the number of memory banks which function will depend on the control of the path search width control section 33. That is to say, memory banks not used will be put in an inactive state by, for example, stopping power supply.

The path selection section 32 refers to data output from the delay profile integration section 31, selects n paths in descending order of power of received signal, and outputs information indicative of their timing as effective multipath information.

The path search width control section 33 refers to effective multipath information output from the path selection section 32 and controls the matched filter 30, delay profile integration section 31, and path selection section 32.

Figure 5:
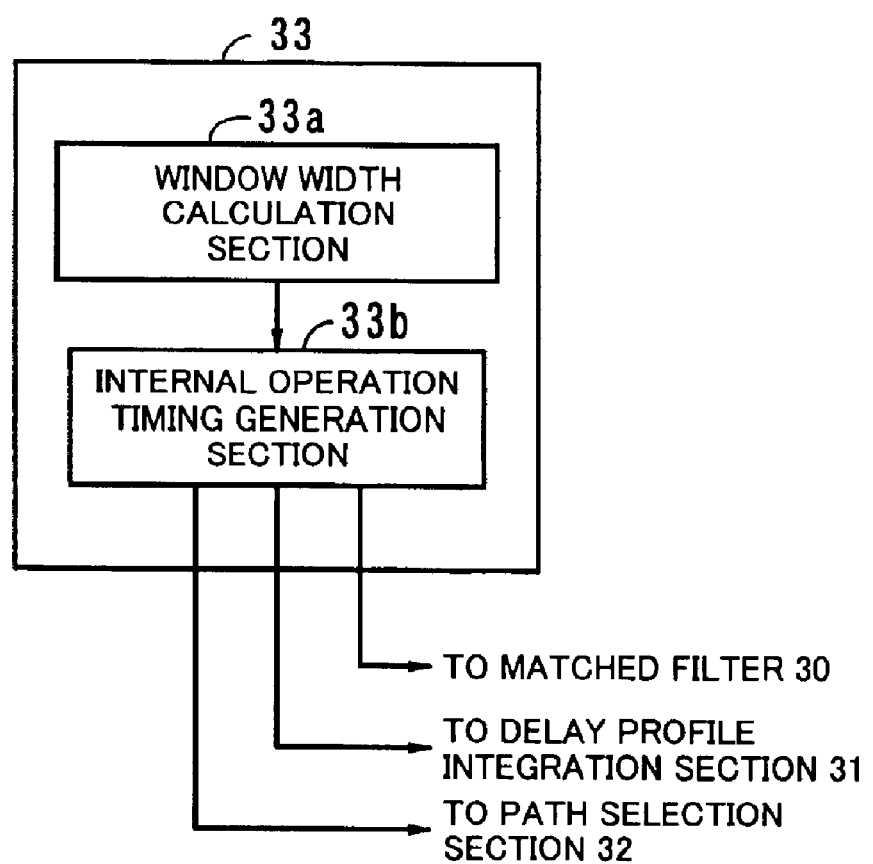
FIG. 5 is a view showing the detailed structure of the path search width control section shown in FIG. 3.

FIG. 5 is a view showing the detailed structure of the path search width control section 33. As shown in FIG. 5, the path search width control section 33 includes a window width calculation section 33a and internal operation timing generation section 33b.

The window width calculation section 33a calculates a range, that is to say, the width of a window in which a path is searched for in the matched filter 30.

The internal operation timing generation section 33b generates a timing signal corresponding to a window calculated by the window width calculation section 33a and supplies it to the matched filter 30, delay profile integration section 31, and path selection section 32.

Now, operation in the above embodiment of the present invention will be described.

The antenna 10 acquires electronic waves sent from a base station and supplies them to the receiving section The receiving section 11 converts the electronic waves acquired by the antenna 10 into RF signals, converts the RF signals into IF signals, and outputs the IF signals.

The quadrature detection section 12 multiplies the signals output from the receiving section 11 and a sine wave together to generate Ich signals, multiplies the signals output from the receiving section 11 and a cosine wave together to generate Qch signals, and outputs the Ich and Qch signals.

The A/D conversion section 13 converts the Ich signals (analog signals) output from the quadrature detection section 12 into digital signals and output them.

The A/D conversion section 14 converts the Qch signals (analog signals) output from the quadrature detection section 12 into digital signals and output them.

As described later, the process of searching for a surrounding base station (cell) is performed first on the data output from the A/D conversion sections 13 and 14. The head of a slot, the head of a frame, and a scrambling code (despreading code) are extracted. The extracted scrambling code is supplied to the path search section 70.

The matched filter 30 in the path search section 70 supplies the extracted scrambling code to the FF 81-1. The scrambling code is transferred in turn to an FF at the next stage in synchronization with a clock signal. As a result, the scrambling code will be stored in the FFs 81-1 through 81-N. The above operation is performed for both the I and Q channels.

After the scrambling code is stored, the A/D conversion sections 13 and 14 begin to supply the Ich data and Qch data respectively. In the matched filter 30 shown in FIG. 4, the received data (Ich data or Qch data) is supplied to the FF 80-1 and is transferred in turn to an FF at the next stage in synchronization with a clock signal. Furthermore, the multiplying circuit 82-1 multiplies the received data output from the FF 80-1 and the scrambling code output from the FF 81-1 together. Each of the multiplying circuits 82-2 through 82-N does multiplication in the same way. The adding circuit 83 adds up output from the multiplying circuits 82-1 through 82-N and outputs the result as despread data.

The despread data output from the matched filter 30 is input to the delay profile integration section 31.

The power value calculation section 31a in the delay profile integration section 31 integrates the despread data output from the matched filter 30 by the slot. In this case, input data and the preceding data which has already been stored in the memory 31b are added up. This operation is repeated, so that the block integrated value of data input in a predetermined period of time is stored in the memory 31b.

Then the power value calculation section 31a calculates $(I+jQ)\times(I-jQ)$ with Ich and Qch data obtained by the integration by the slot to obtain power values.

And then the power value calculation section 31a integrates the power values by the frame and outputs results obtained to the path selection section 32.

The path selection section 32 selects three peaks of the signal output from the delay profile integration section 31 in descending order of level and outputs their timing as effective multipath information.

Figure 6:
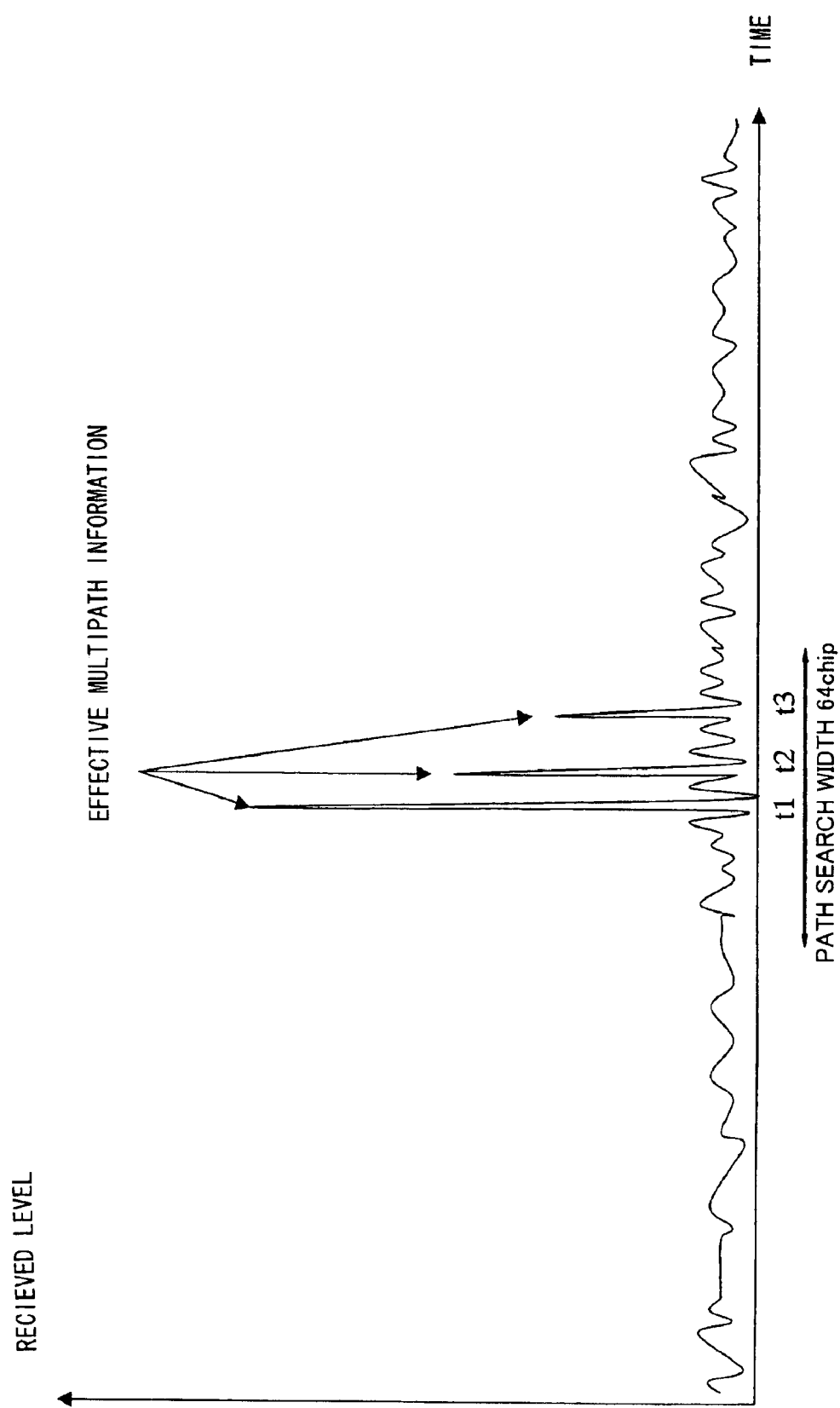
FIG. 6 is a view showing an example of cases where signals output from the delay profile integration section have three peaks.

As shown in FIG. 6, for example, if the signal output from the delay profile integration section 31 has three peaks, then the path selection section 32 outputs t1, t2, and t3, being information indicative of the timing of these three peaks, as effective multipath information.

The path search width control section 33 receives the effective multipath information and supplies it to the window width calculation section 33a.

The window width calculation section 33a calculates an interval (t3-t1) between the input timing t1 and t3 and sets window width by adding a predetermined margin to this value. Instead of adding a predetermined value, a margin can be added by multiplying the interval between the timing t1 and t3 by a predetermined value (>1).

Then the window width calculation section 33a sets a window so that t1 which has the highest received level of the three effective multipaths will be situated in the middle of the window. Moreover, the window width calculation section 33a informs the internal operation timing generation section 33b of information regarding the window it set. In this example, 64 chips with t1 as a center of a total of 256 chips of data are set as window width.

The internal operation timing generation section 33b performs setting to limit the operation of the memory 31b according to the amount of data.

For example, it is assumed that the memory 31b is divided into a plurality of areas and that the supply of power to each area can be performed or stopped independently. Then the amount of power consumed by the memory 31b can be minimized by using only necessary areas and stopping the operation of the rest of the areas according to window width.

When a path search is begun, the internal operation timing generation section 33b judges whether window starting time has come. When the window starting time comes, the internal operation timing generation section 33b informs the matched filter 30, delay profile integration section 31, and path selection section 32 of this.

As a result, the supply of received data to the FF 80-1 in the matched filter 30 is begun and the adding circuit 83 outputs correlation values between the received data and a despreading code. When window ending time comes, the operation of the matched filter 30 is stopped. An unnecessary waste of power can be prevented by minimizing the operation of the matched filter 30.

A signal output from the matched filter 30 is supplied to the delay profile integration section 31 and the process of calculating power values is performed there in the same way that was described above. In this case, however, the matched filter 30 outputs only data that falls within the range specified by the window. The amount of power consumed therefore can be limited by stopping the operation of part of the areas in the memory 31*b*.

Data output from the delay profile integration section 31 is supplied to the path selection section 32 and t1 through t3 will be detected as information indicative of the timing of three peaks in the same way that was described above. The amount of target data will decrease (from 256 chips to 64 chips, in this example) in the process of detecting t1 through t3, so the number of times the path selection section 32 performs an operation will decrease. As a result, the amount of power consumed by the path selection section 32 can also be reduced.

When effective multipath information is generated in this way, the path search width control section 33 receives this information, sets window width to be used for performing the next path search, and generates internal operation timing. Then the next path search process will be performed.

By the way, when this process is repeated a predetermined number of times or for a predetermined period of time, the window width calculation section 33*a* resets window width unconditionally to 256 chips. By resetting window width every predetermined period of time in this way, a path outside a window can also be processed without being missed.

Figure 7:
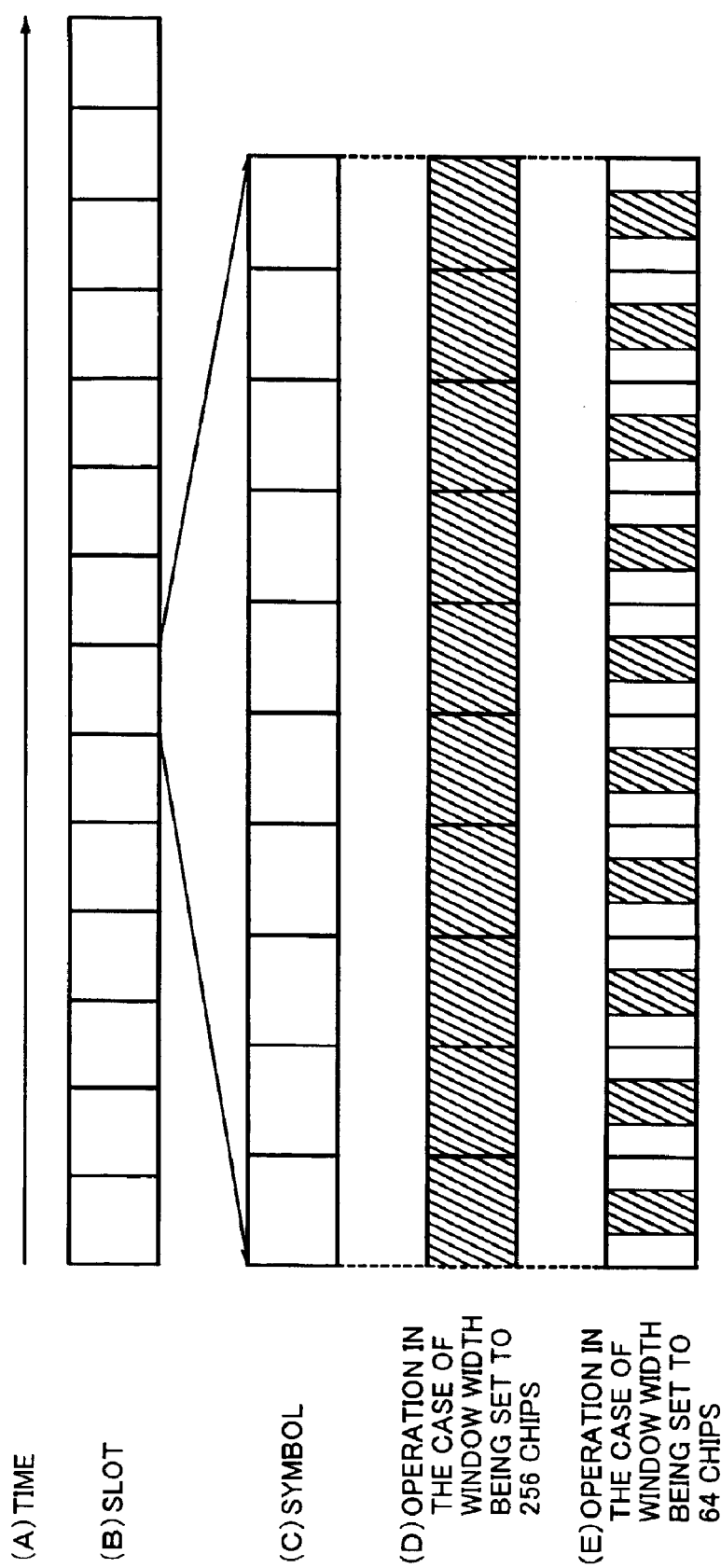
FIG. 7 is a view showing an example of relationships among slots, symbols, and windows.

FIG. 7 is a view showing relationships among slots, symbols, and windows. As shown in FIG. 7(B), each slot consists of symbols including 2-bit information. One symbol corresponds to 256 chips.

As shown by hatched areas in FIG. 7(D), if window width is 256 chips, a path search process will be performed throughout each symbol.

As shown by hatched areas in FIG. 7(E), if window width is 64 chips, a path search process will be performed only in part of each symbol.

Therefore, compared with a conventional method shown in FIG. 7(D), the method according to this embodiment shown in FIG. 7(E) enables a reduction in power consumption by performing a path search process intermittently.

If there are a plurality of base stations, power consumption can be reduced by setting a window for each base station and performing the same process that was described above.

It is rare that terrains between a receiving unit and base stations differ significantly from one another. Therefore, a window set for a representative base station can be applied to the other base stations. This avoids the necessity of setting windows according to base stations and therefore reduces the amount of processing, resulting in a reduction in power consumption.

Figure 8:
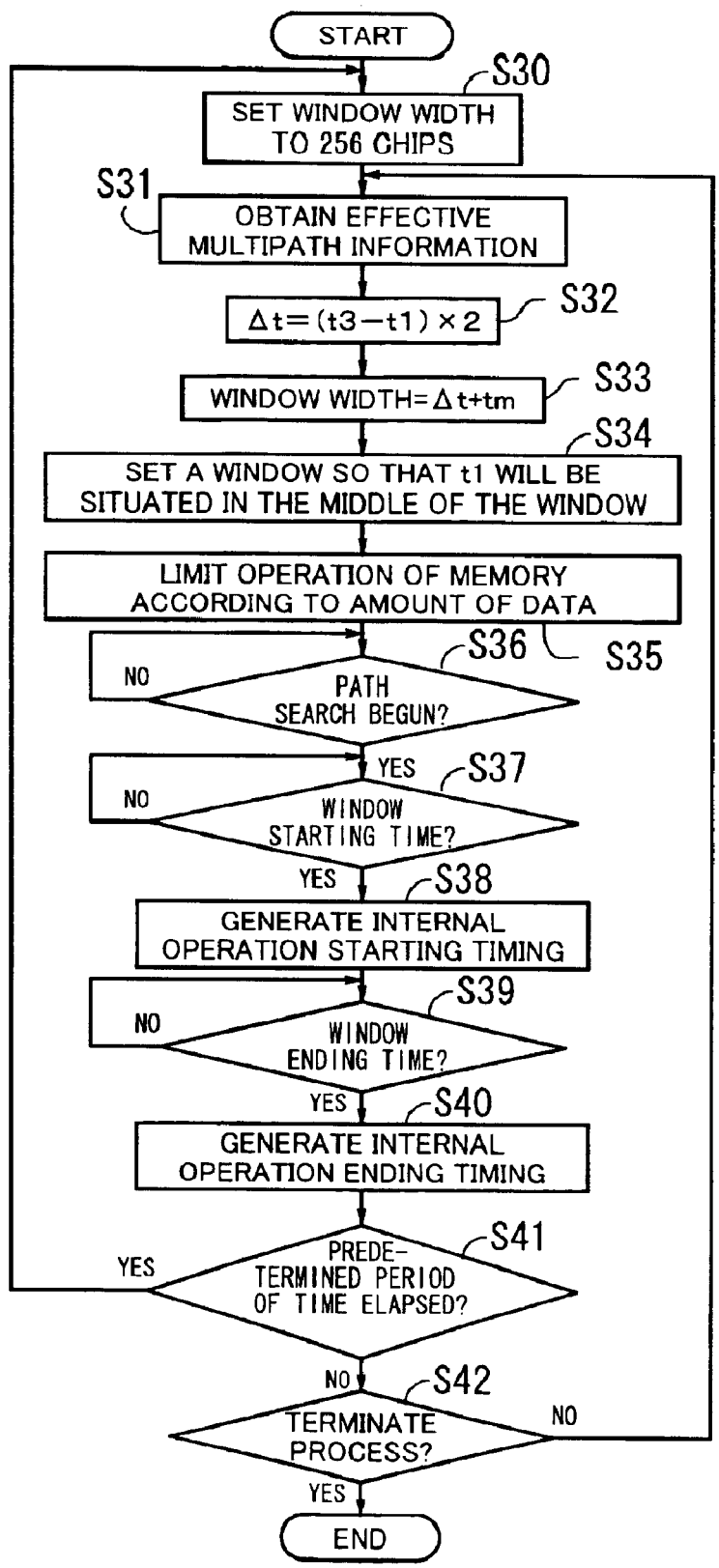
FIG. 8 is a flow chart for describing an example of a process performed in the embodiment shown in FIG. 2.

Now, a flow chart in which the above process is summarized will be described with reference to FIG. 8. The following steps will be performed in compliance with this flow chart.

[Step S30] The window width calculation section 33*a* in the path search width control section 33 sets window width to 256 chips.

[Step S31] The window width calculation section 33*a* receives effective multipath information (information indicative of the timing of t1 through t3) from the path selection section 32.

[Step S32] The window width calculation section 33*a* multiplies a value obtained by subtracting t1 from t3 by two and assigns a value obtained to Δt.

[Step S33] The window width calculation section 33*a* sets a value obtained by adding predetermined margin value tm to Δt as window width.

[Step S34] The window width calculation section 33*a* sets a window so that the maximum peak t1 will be situated in the middle of the window.

[Step S35] The internal operation timing generation section 33*b* calculates the amount of data generated in the case of a path search from the window width set by the window width calculation section 33*a* and limits the operation of unnecessary areas in the memory 31*b* in the delay profile integration section 31. Methods for limiting the operation of unnecessary areas in the memory 31*b* include stopping the supply of power to the unnecessary areas, limiting access to the unnecessary areas, and stopping the supply of a clock to the unnecessary areas.

[Step S36] The internal operation timing generation section 33*b* judges whether a path search has been begun. If the internal operation timing generation section 33*b* judges that a path search has been begun, then the internal operation timing generation section 33*b* proceeds to step S37. If the internal operation timing generation section 33*b* judges that a path search has not been begun, then the internal operation timing generation section 33*b* repeats the same process.

[Step S37] The internal operation timing generation section 33*b* judges whether window starting time has come. If the internal operation timing generation section 33*b* judges that the window starting time has come, then the internal operation timing generation section 33*b* proceeds to step S38. If the internal operation timing generation section 33*b* judges that the window starting time has not come, then the internal operation timing generation section 33*b* repeats the same process.

[Step S38] The internal operation timing generation section 33*b* generates internal operation starting timing and supplies it to the matched filter 30. As a result, the matched filter 30 begins the process of calculating correlation values between received data and a despreading code.

[Step S39] The internal operation timing generation section 33*b* judges whether window ending time has come. If the internal operation timing generation section 33*b* judges that the window ending time has come, then the internal operation timing generation section 33*b* proceeds to step S40. If the internal operation timing generation section 33*b* judges that the window ending time has not come, then the internal operation timing generation section 33*b* repeats the same process.

[Step S40] The internal operation timing generation section 33*b* generates internal operation ending timing and supplies it to the matched filter 30. As a result, the matched filter 30 ends the process of calculating correlation values between the received data and the despreading code.

[Step S41] The window width calculation section 33*a* judges whether a predetermined period of time has elapsed after beginning the process. If the window width calculation section 33a judges that the predetermined period of time has elapsed, then the window width calculation section 33a returns to step S30 and repeats the same process. If the window width calculation section 33a judges that the predetermined period of time has not elapsed, then step S42 is performed. As a result of the process in this step, the window width will be reset to 256 chips after a certain period of time has elapsed.

[Step S42] The path search width control section 33 judges whether to terminate the process. If the path search width control section 33 does not terminate the process, then the path search width control section 33 returns to step S31 and repeats the same process. If the path search width control section 33 terminates the process, then the process terminates.

As stated above, this process enables a reduction in power consumption by limiting window width.

Figure 9:
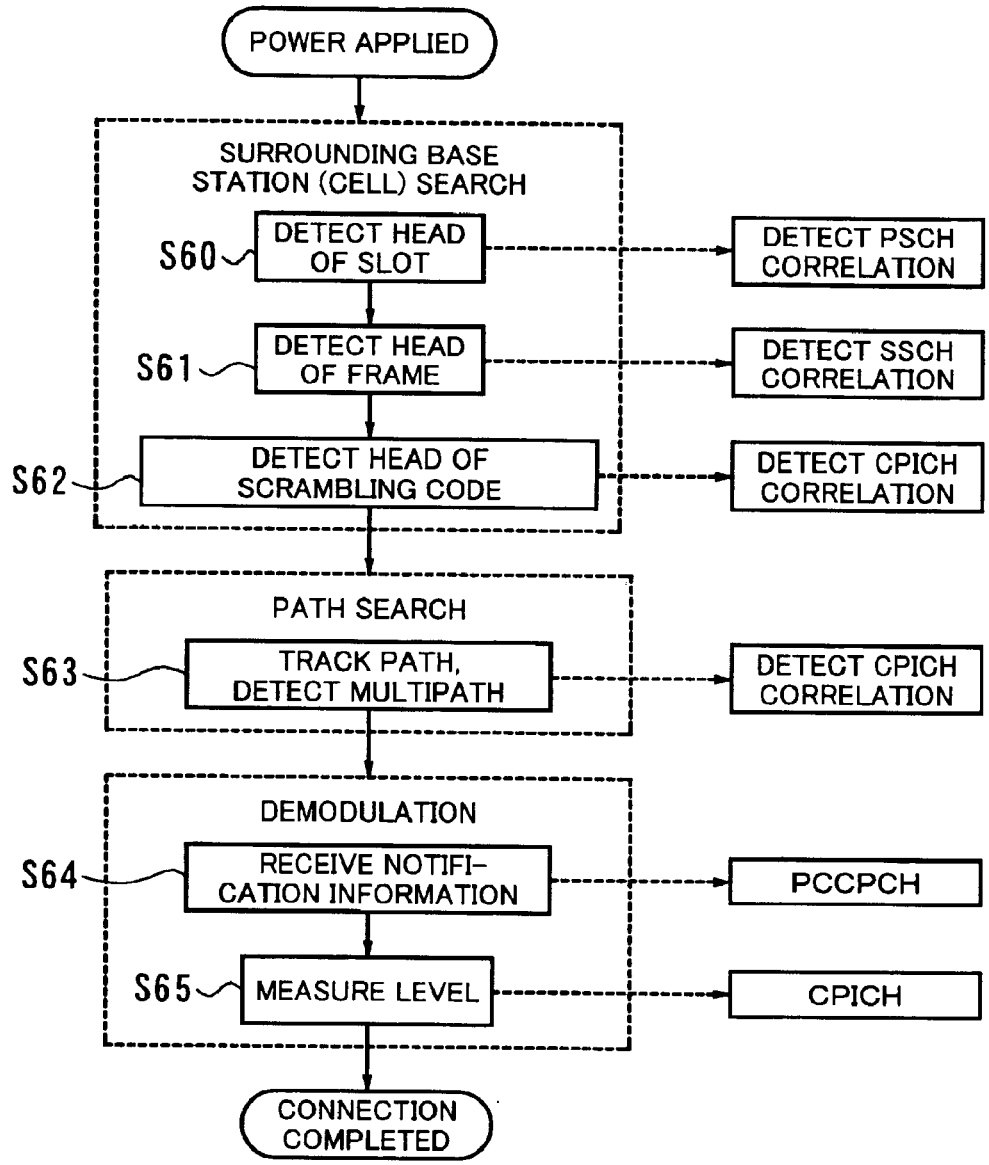
FIG. 9 is a flow chart for describing an example of a process performed after power being applied and before a receiving unit being connected to a base station.

Now, more detailed operation in this embodiment will be described with reference to FIGS. 9 and 10.

[Step S60] When power is applied to the receiving unit, a cell search section (not shown) in the receiving unit detects the head of a slot in a received signal by detecting a primary synchronization channel (PSCH) (see FIG. 10) included in the head portion of the slot.

[Step S61] The cell search section detects the head of a frame by detecting a secondary synchronization channel (SSCH) (see FIG. 10) included in the head portion of each slot in the received signal. That is to say, a predetermined number is given to an SSCH, so the head of a frame can be specified by following this number.

[Step S62] The cell search section detects the head of a common pilot channel (CPICH) (see FIG. 10) in which a scrambling code is stored, and specifies a scrambling code unique to a base station.

[Step S63] The path search section 70 refers to the CPICH (see FIG. 10) and performs path tracking and multipath detection processes.

Figure 10:
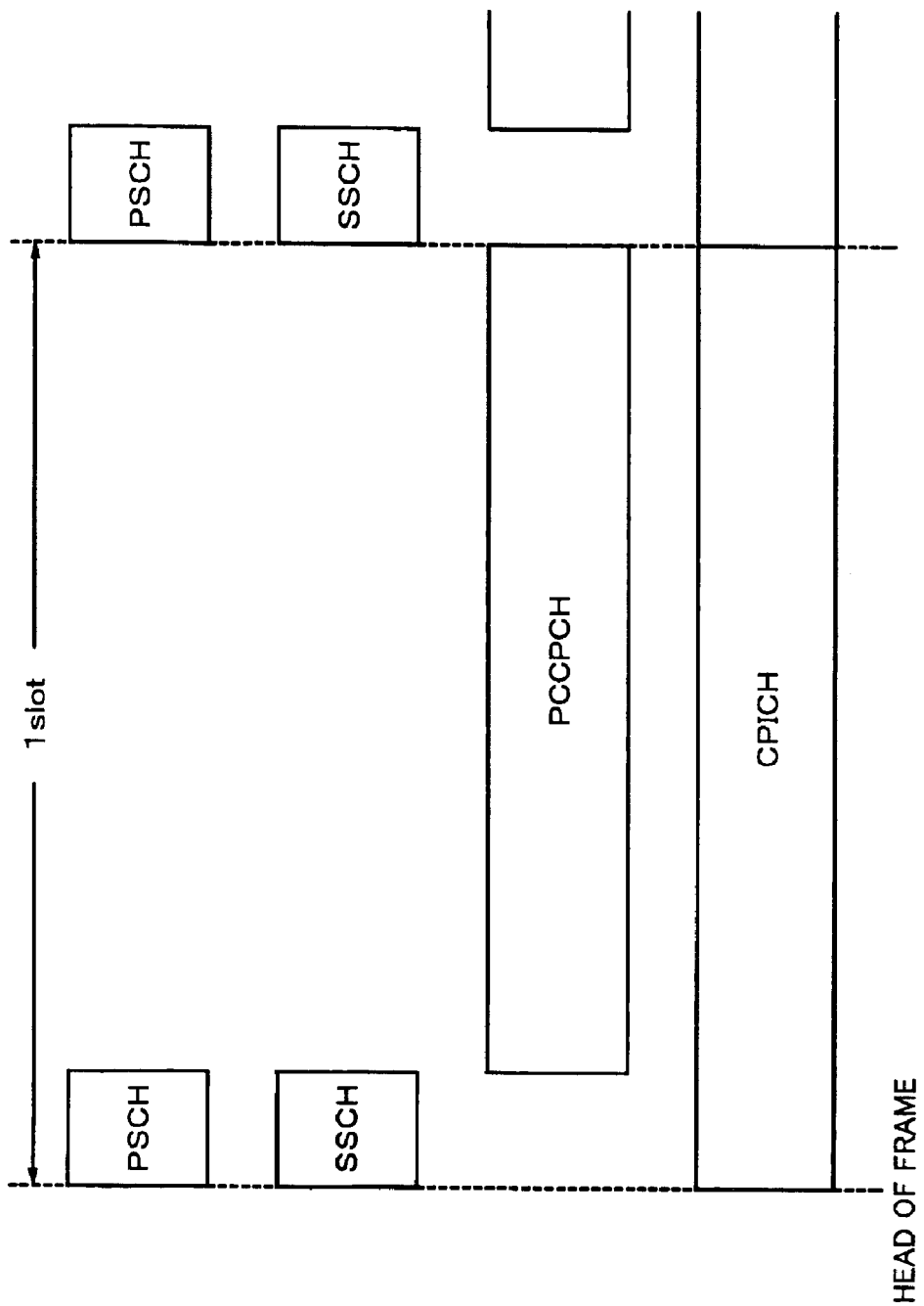
FIG. 10 is a view showing relationships among PSCH, SSCH, PCCPCH, and PCICH.

[Step S64] The RAKE combining/demodulation section 16 receives notification information from a primary common control physical channel (PCCPCH) (see FIG. 10).

[Step S65] The RAKE combining/demodulation section 16 refers to the CPICH and performs the process of measuring the level of the received signal.

The above process enables the detection of a base station and communication with this base station in the case of power being applied to a receiving unit.

In the above embodiment, window width is determined uniquely from effective multipath information. However, if window width changes rapidly, some paths may be missed. Window width therefore can be controlled so that the difference between the last window width and the present window width will not exceed a predetermined value. This can prevent a rapid change in window width and reduce the possibility that malfunction will occur in searching for a path.

In the above embodiment, the descriptions were given with the receiving unit for mobile communication as an example. However, the main of the present invention is the path search section 70, so only this section can be embodied as a semiconductor device.

Moreover, it is a matter of course that not only the path search section 70 but also other components can be embodied as one semiconductor device.

Furthermore, in the above embodiment, the descriptions were given with a case where three paths are detected as an example. However, it is a matter of course that the present invention is also applicable to cases where the number of paths is not three.

As has been described in the foregoing, a receiving unit for receiving and demodulating signals sent from a base station, according to the present invention, comprises receiving means for receiving signals sent from the base station and transmitted via a plurality of paths, path detecting means for detecting the timing of each of the plurality of paths via which the received signals received by the receiving means were transmitted, and path detection range setting means for setting a range where a path is detected by the path detecting means on the basis of information indicative of path timing detected by the path detecting means. Therefore, power consumption can be reduced by operating the path detecting means intermittently.

Moreover, a receiving method for receiving and demodulating signals sent from a base station comprises a receiving step for receiving signals sent from the base station and transmitted via a plurality of paths, path detecting step for detecting the timing of each of the plurality of paths via which the received signals received by the receiving step were transmitted, and path detection range setting step for setting a range where a path is detected by the path detecting step on the basis of information indicative of path timing detected by the path detecting step. This will lengthen the life of a battery.

Furthermore, a semiconductor device for processing signals sent from a base station comprises path detecting means for detecting the timing of each of a plurality of paths via which received signals were received and path detection range setting means for setting a range where a path is detected by the path detecting means on the basis of information indicative of path timing detected by the path detecting means. This will enable a reduction in the amount of heat generated by a semiconductor device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A receiving unit for receiving and demodulating signals sent from a base station, the unit comprising:
   a receiving section for receiving signals sent from the base station and transmitted via a plurality of paths;
   a path detecting section for detecting timing of each of the plurality of paths via which the received signals received by the receiving section were transmitted; and
   a path detection range setting section for setting a range where a path is detected by the path detecting section on the basis of information indicative of path timing detected by the path detecting section, and
   wherein the path detecting section includes a path selection section for selecting n paths in descending order of power of the received signals from among a plurality of paths detected as effective multipaths, the path detection range setting section includes a detection range calculation section for setting the range where a path is detected by the path detecting section to a range narrower than a maximum detection range so that the range will include all n effective multipaths selected, and the path detection range setting section initializes the range where a path is detected to the maximum detection range every predetermined cycle.

2. The receiving unit according to claim 1, wherein the path detection range setting section sets a range where the path is detected each time the path detecting section performs a path detection process.

3. The receiving unit according to claim 1, wherein the path detecting section includes a path selection section for selecting n paths in descending order of power of the received signal from among a plurality of paths detected as effective multipaths, further wherein the path detection range setting section includes a detection range calculation section for setting the range where a path is detected by the path detecting section so that the range will include all of the n effective multipaths selected and a predetermined margin.

4. The receiving unit according to claim 3, wherein the path detection range setting section adds a predetermined value to the range to secure the margin.

5. The receiving unit according to claim 3, wherein the path detection range setting section multiplies the range by a predetermined value (>1) to secure the margin.

6. The receiving unit according to claim 1, wherein the path detection range setting section sets the range where a path is detected so that the difference between a value set the last time and a value set this time will be within a predetermined range.

7. The receiving unit according to claim 1, wherein the path detection range setting section sets the ranges where a path is detected corresponding to each of base stations if there are a plurality of base stations.

8. The receiving unit according to claim 1, wherein the path detection range setting section sets the range where a path is detected common to all of the base stations even if there are a plurality of base stations.

9. The receiving unit according to claim 1, wherein the path detecting section includes an integration section for integrating correlation values between the received signals and a predetermined despreading code, further wherein the integration section integrates only correlation values corresponding to the range where a path is detected set by the path detection range setting section.

10. The receiving unit according to claim 9, wherein the path detection range setting section includes an internal operation timing generation section for generating a timing signal to control the beginning/ending of a process performed by the integration section according to the range where a path is detected by the path detecting section.

11. The receiving unit according to claim 9, wherein the integration section includes a storage section including a plurality of storage areas for storing temporarily data on which the integration is being done, further wherein the path detection range setting section includes an internal operation timing generation section for operating selectively only some of the plurality of storage areas the number of which corresponds to range where a path is detected by the path detecting section and for stopping the operation of the other storage areas.

12. The receiving unit according to claim 1, further comprising a path selection section for selecting a path detected by the path detecting section, wherein the path selection section selects a path corresponding to the range where a path is detected set by the path detection range setting section.

13. The receiving unit according to claim 12, wherein the path detection range setting section includes an internal operation timing generation section for generating a timing signal to control the beginning/ending of a process performed by the path selection section according to the range where a path is detected by the path detecting section.

14. A receiving method for receiving and demodulating signals sent from a base station, the method comprising:
a receiving step for receiving signals sent from the base station and transmitted via a plurality of paths;
a path detecting step for detecting timing of each of the plurality of paths via which the received signals received by the receiving step were transmitted; and
a path detection range setting step for setting a range where a path is detected by the path detecting step on the basis of information indicative of path timing detected by the path detecting step, and
wherein n paths are selected in descending order of power of the received signals from among a plurality of paths detected as effective multipaths, the range is set where a path is detected to a range narrower than a maximum detection range so that the range will include all n effective multipaths selected, and the path detection range setting section initializes the range where a path is detected to the maximum detection range every predetermined cycle.

15. A semiconductor device for processing signals sent from a base station, the device comprising:
a path detecting section for detecting timing of each of a plurality of paths via which received signals were received; and
a path detection range setting section for setting a range where a path is detected by the path detecting section on the basis of information indicative of path timing detected by the path detecting section, and
wherein the path detecting section includes a path selection section for selecting n paths in descending order of power of the received signals from among a plurality of paths detected as effective multipaths, the path detection range setting section includes a detection range calculation section for setting the range where a path is detected by the path detecting section to a range narrower than a maximum detection range so that the range will include all n effective multipaths selected, and the path detection range setting section initializes the range where a path is detected to the maximum detection range every predetermined cycle.

16. A receiving unit for receiving and demodulating signals sent from a base station, the unit comprising:
a receiving section for receiving signals sent from the base station and transmitted via a plurality of paths;
a path detecting section for detecting timing of each of the plurality of paths via which the received signals received by the receiving section were transmitted; and
a path detection range setting section for setting a range where a path is detected by the path detecting section on the basis of information indicative of path timing detected by the path detecting section, wherein the path detecting section includes a path selection section for selecting n paths in descending order of power of the received signals from among a plurality of paths detected as effective multipaths and
the path detection range setting section includes a detection range calculation section for setting the range where a path is detected by the path detecting section to a range narrower than a maximum detection range so that the range will include all of the n effective multipaths selected.

* * * * *